(12) United States Patent
Chen et al.

(10) Patent No.: US 11,731,324 B2
(45) Date of Patent: Aug. 22, 2023

(54) MOLDING DEVICE AND INJECTION MOLDING METHOD THEREOF

(71) Applicant: KING STEEL MACHINERY CO., LTD., Taichung (TW)

(72) Inventors: Fa-Shen Chen, Taichung (TW); Yi-Chung Lee, Taichung (TW); Liang-Hui Yeh, Taichung (TW); Ching-Hao Chen, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 17/830,417

(22) Filed: Jun. 2, 2022

(65) Prior Publication Data
US 2023/0059719 A1    Feb. 23, 2023

Related U.S. Application Data

(60) Provisional application No. 63/236,044, filed on Aug. 23, 2021.

(51) Int. Cl.
*B29C 44/42* (2006.01)
*B29C 44/02* (2006.01)
(Continued)

(52) U.S. Cl.
CPC ............ *B29C 44/428* (2013.01); *B29C 44/02* (2013.01); *B29C 44/35* (2013.01); *B29C 44/582* (2013.01)

(58) Field of Classification Search
CPC ....... B29C 45/56; B29C 44/428; B29C 44/35; B29C 44/582
See application file for complete search history.

(56) References Cited

U.S. PATENT DOCUMENTS

| 2,955,972 A | 10/1960 | Wintermute et al. |
| 3,871,806 A | 3/1975 | Leunig |

(Continued)

FOREIGN PATENT DOCUMENTS

| CN | 1826214 A | 8/2006 |
| CN | 209176025 U | 7/2019 |

(Continued)

OTHER PUBLICATIONS

Extended Search Report from the European Patent Office of EP patent application No. EP22 172 580.7-1014 dated Oct. 14, 2022.

(Continued)

*Primary Examiner* — Kelly M Gambetta
*Assistant Examiner* — Virak Nguon
(74) *Attorney, Agent, or Firm* — WPAT Law; Anthony King

(57) ABSTRACT

A molding device and an injection molding method thereof are provided. The molding device includes a first mold, a second mold and a sealing ring. The first mold includes a first body and at least one slide. The at least one slide is movably and detachably disposed on the first body, and has an undercut. The injection molding method includes operations of: engaging the first mold with the second mold of the molding device; filling a mold cavity defined by the first mold and the second mold with a gas, wherein the gas is blocked by the sealing ring disposed between the first mold and the second mold; injecting a molding material into the mold cavity; and opening the first mold and the second mold of the molding device.

20 Claims, 15 Drawing Sheets

(51) Int. Cl.
*B29C 44/34* (2006.01)
*B29C 44/58* (2006.01)

(56) References Cited

U.S. PATENT DOCUMENTS

| | | | |
|---|---|---|---|
| 3,891,362 A | | 6/1975 | Devita |
| 4,042,663 A | | 8/1977 | Harder, Jr. |
| 4,699,581 A | | 10/1987 | Nagasaka |
| 5,976,289 A | | 11/1999 | Kawakubo |
| 5,989,480 A | * | 11/1999 | Yamazaki ............ B29C 45/1418 264/153 |
| 5,997,781 A | | 12/1999 | Choe |
| 2004/0108612 A1 | | 6/2004 | Yamaki |
| 2006/0062967 A1 | | 3/2006 | Summerer |
| 2009/0140447 A1 | * | 6/2009 | Kawamura ......... B29C 45/2608 425/546 |
| 2012/0196115 A1 | | 8/2012 | Choe et al. |
| 2014/0084663 A1 | | 3/2014 | Todd |
| 2016/0082635 A1 | * | 3/2016 | Kobayashi ............ B29C 70/48 425/546 |
| 2020/0391416 A1 | | 12/2020 | Burnham et al. |

FOREIGN PATENT DOCUMENTS

| | | |
|---|---|---|
| CN | 110234486 A | 9/2019 |
| CN | 215661431 A | 1/2022 |
| EP | 0692358 A1 | 1/1996 |
| EP | 3789176 A1 | 3/2021 |
| EP | 3808527 A1 | 4/2021 |
| EP | 3815870 A1 | 5/2021 |
| GB | 2179886 A | 3/1987 |
| JP | 2000006198 A | 1/2000 |
| JP | 2010115908 A * | 5/2010 |
| TW | 202000427 A | 1/2020 |
| TW | 202138158 A | 10/2021 |
| TW | M634595 U | 11/2022 |
| WO | 93/22129 A1 | 11/1993 |

OTHER PUBLICATIONS

Non-Final Rejection and List of References of U.S. Appl. No. 17/547,744 dated Oct. 26, 2022.
European Search Report from the European Patent Office of EP patent application No. EP22 187 756.6-1014 dated Dec. 2, 2022.
Office action, Cited References and Search report dated Dec. 1, 2022 issued by the Taiwan Intellectual Property Office (TIPO) for the Taiwanese application No. 111128677.
European Search Report from the European Patent Office of EP patent application No. EP22 191 550.7-1014 dated Dec. 14, 2022.
Office action, Cited References and Search report dated Jan. 4, 2023 issued by the Taiwan Intellectual Property Office (TIPO) for the Taiwanese application No. 111131135.
Rejection Decision dated Jan. 5, 2023 issued by the Taiwan Intellectual Property Office (TIPO) for the Taiwanese application No. 110141653.

* cited by examiner

MOLDING DEVICE AND INJECTION MOLDING METHOD THEREOF

CROSS REFERENCE TO RELATED APPLICATIONS

This application claims priority of U.S. provisional application No. 63/236,044 filed on Aug. 23, 2021, which is incorporated by reference in its entirety.

TECHNICAL FIELD

The present invention is related to a molding device and an injection molding method using the same, and, in particular, to a molding device, which has an undercut, including a slide, and an injection molding method using the same.

BACKGROUND

Foamed polymeric material has many advantages, such as high strength, low weight, impact resistance, thermal insulation, and others. Articles can be made by injection molding. For example, after the polymeric material is melted and mixed with a blowing agent to form a mixture, a force or pressure is applied to the mixture to inject the mixture into a cavity of a mold, and the mixture is foamed and cooled in the cavity to form the article.

However, it is necessary to improve the efficiency, the quality and the yield of forming the article. Therefore, there is a need for improvements to structures of the molding device and the method for using the same.

BRIEF SUMMARY OF THE INVENTION

According to one embodiment of the present disclosure, a molding device is provided. The molding device includes a first mold, a second mold, a mold cavity and a sealing ring. The first mold includes a first body and at least one slide. The at least one slide is movably and detachably disposed on the first body, and has an undercut. The mold cavity is defined by the first mold and the second mold. The sealing ring is disposed between the first mold and the second mold for sealing the mold cavity when the first mold is engaged with the second mold.

According to one embodiment of the present disclosure, an injection molding method is provided. The injection molding method includes: engaging a first mold with a second mold of a molding device, wherein the first mold includes a first body and at least one slide, the at least one slide is movably and detachably disposed on the first body and has an undercut; filling a mold cavity defined by the first mold and the second mold with a gas, wherein the gas is blocked by a sealing ring disposed between the first mold and the second mold; injecting a molding material into the mold cavity; and opening the first mold and the second mold of the molding device.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
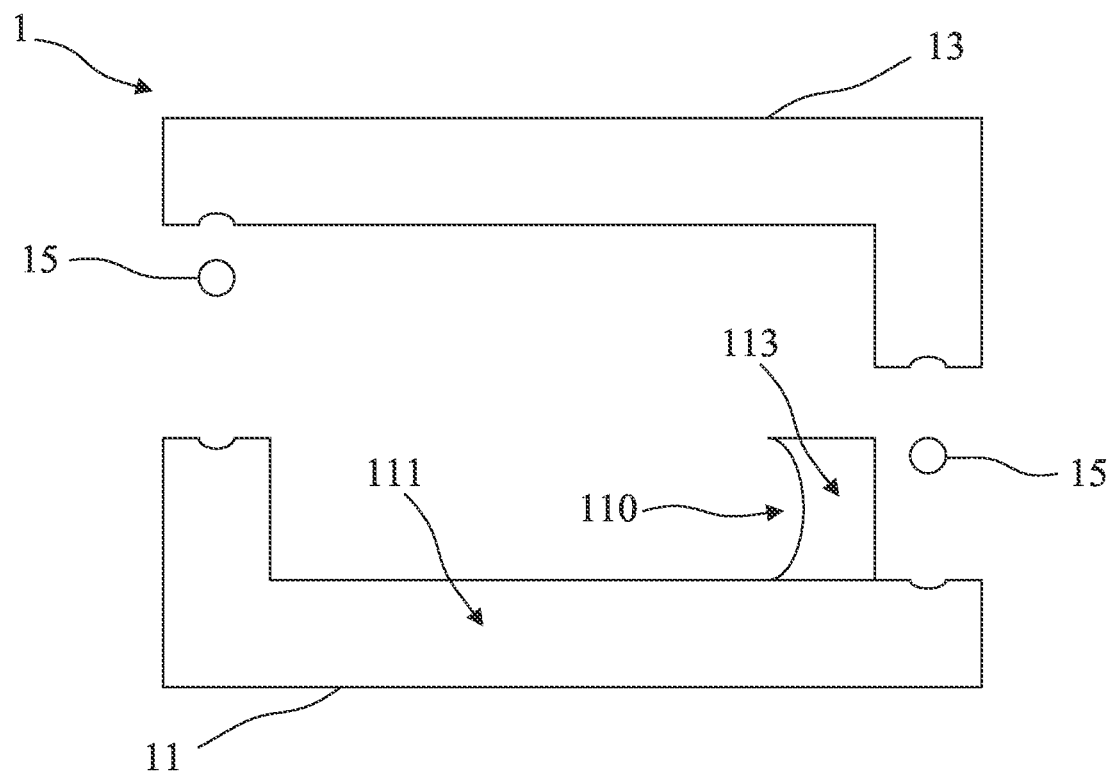
FIGS. 1A to 1F are schematic cross-sectional views illustrating a molding device according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1A is a schematic cross-sectional view illustrating a molding device 1. In some embodiments, the molding device 1 includes a first mold 11, a second mold 13 and a sealing ring 15. The first mold 11 includes a first body 111 and at least one slide 113. The at least one slide 113 is movably and detachably disposed on the first body 111, and has an undercut 110 (i.e., the undercut 110 is formed on the at least one slide 113). The sealing ring 15 is disposed between the first mold 11 and the second mold 13. The sealing ring 15 is disposed around the molding device 1 for blocking leakage of gas from inside of the molding device 1.

Figure 1B:
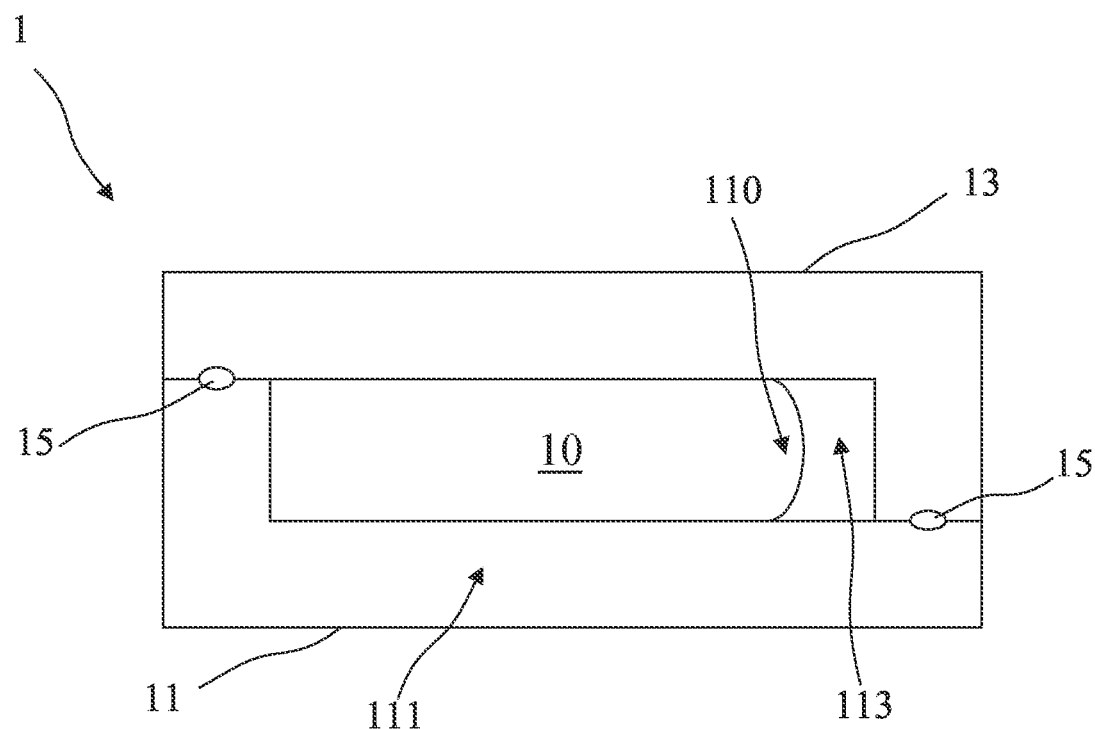

FIG. 1B is another schematic cross-sectional view illustrating the molding device 1. In some embodiments, when the first mold 11 and the second mold 13 are engaged, a mold cavity 10 for forming article is defined by the first mold 11 and the second mold 13, and the sealing ring 15 is clamped by the first mold 11 and the second mold 13.

Figure 1C:
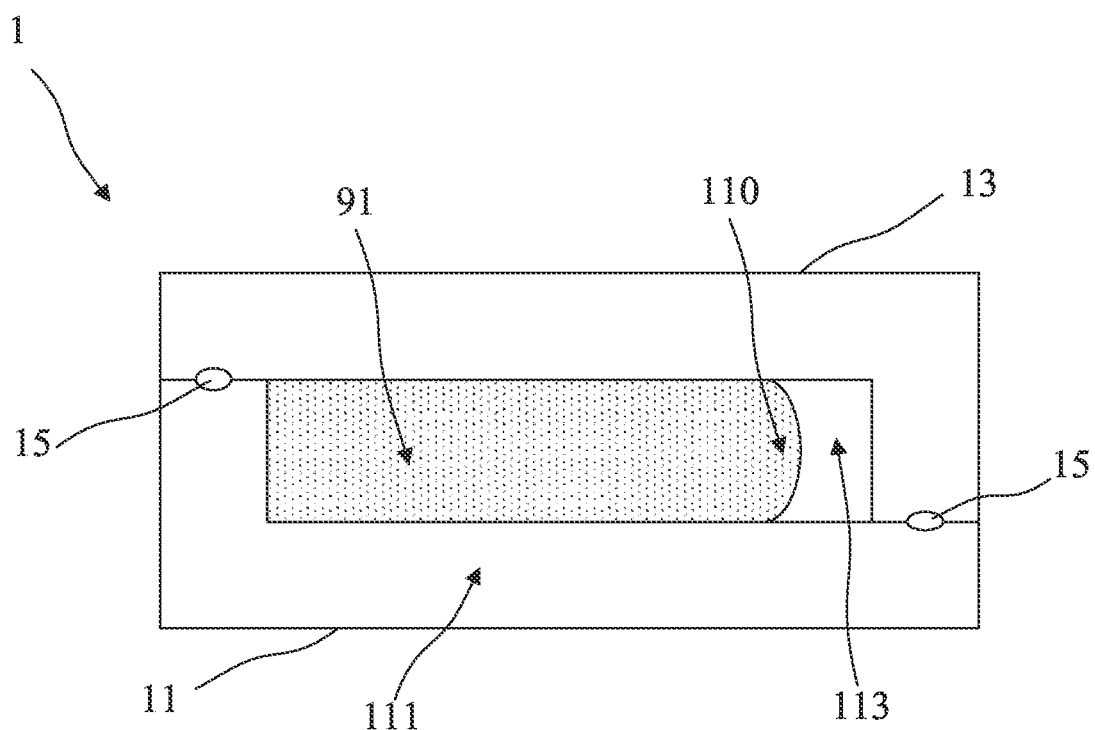

FIG. 1C is another schematic cross-sectional view illustrating the molding device 1. In some embodiments, after engaging the first mold 11 with the second mold 13, a gas 91 is filled into the mold cavity 10 from at least one conduit (not shown), which is disposed on the first mold 11, the second mold 13 or both the first mold 11 and the second mold 13. The sealing ring 15 disposed between the first mold 11 and the second mold 13 is configured to block leakage of the gas.

In some embodiments, the sealing ring 15 may block the gas 91 with a predetermined gas pressure inside the mold cavity 10 when the first mold 11 and the second mold 13 are engaged. The predetermined gas pressure may be greater than 1 atmosphere.

Figure 1D:
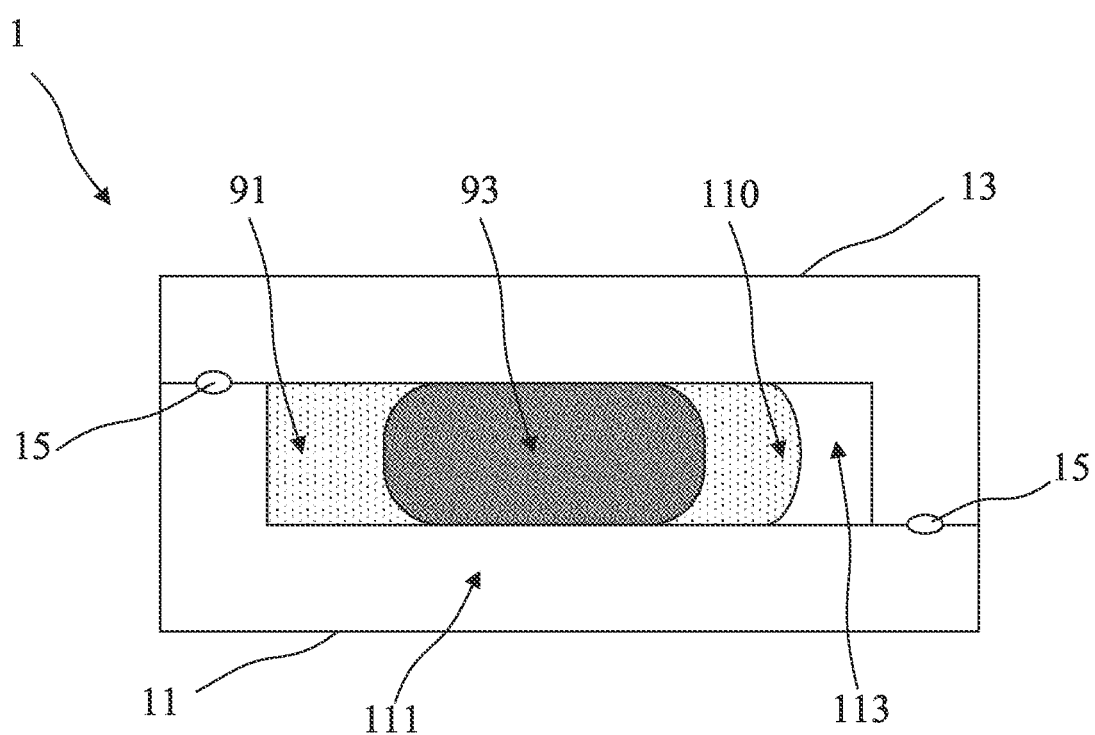
Figure 1E:
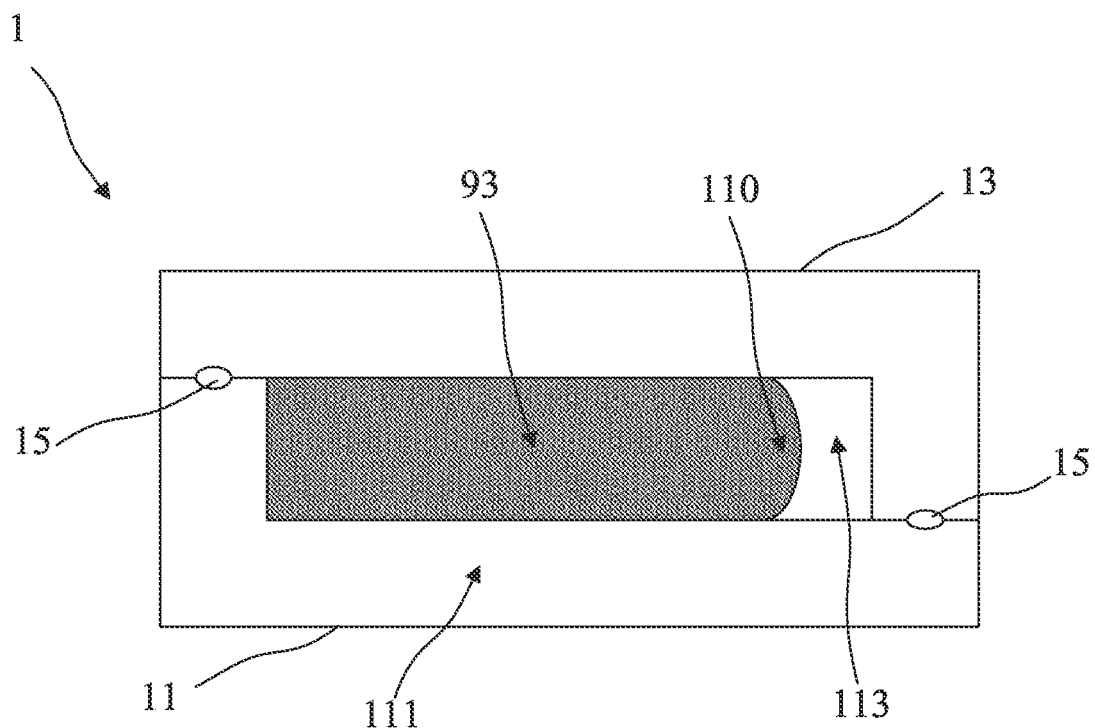

FIGS. 1D and 1E are schematic cross-sectional views illustrating the molding device 1. In some embodiments, after filling the gas 91 into the mold cavity 10, a molding material 93 is injected into the mold cavity 10 from at least one feeding port (not shown), which is disposed on the first mold 11, the second mold 13 or both the first mold 11 and the second mold 13. In some embodiments, the molding material 93 includes a mixture formed by a melted polymeric material mixed with a blowing agent.

Figure 1F:
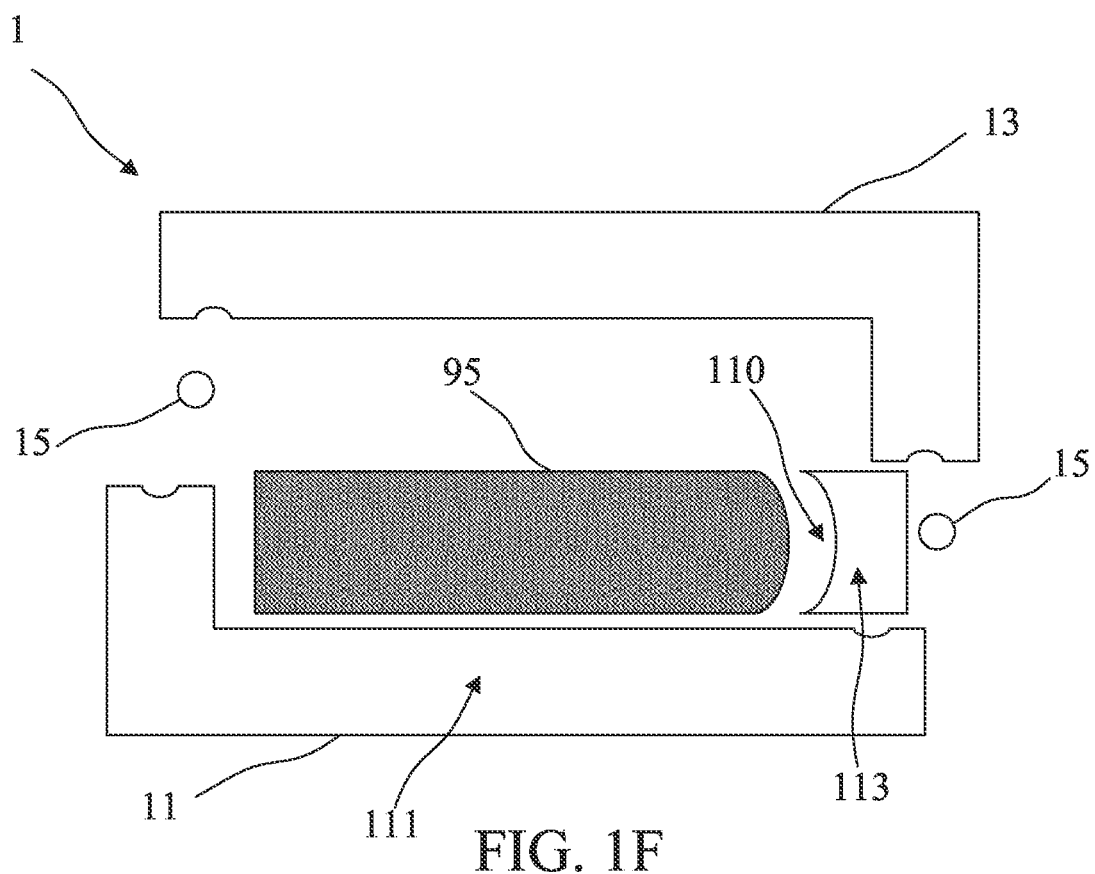

FIG. 1F is another schematic cross-sectional view illustrating the molding device 1. In some embodiments, after the injected molding material 93 cooled down, the first mold 11 and the second mold 13 are opened. The at least one slide 113 is detached for demolding an article 95 from the mold device 1. More specifically, before demolding the article 95 from the mold device 1, the article 95 is held or secured by the undercut 110 of the at least one slide 113. Therefore, the article 95 cannot be picked up easily unless the at least one slide 113 is laterally moved. In other words, after the movement of the at least one slide 113, the article 95 can then be picked up easily.

Figure 2A:
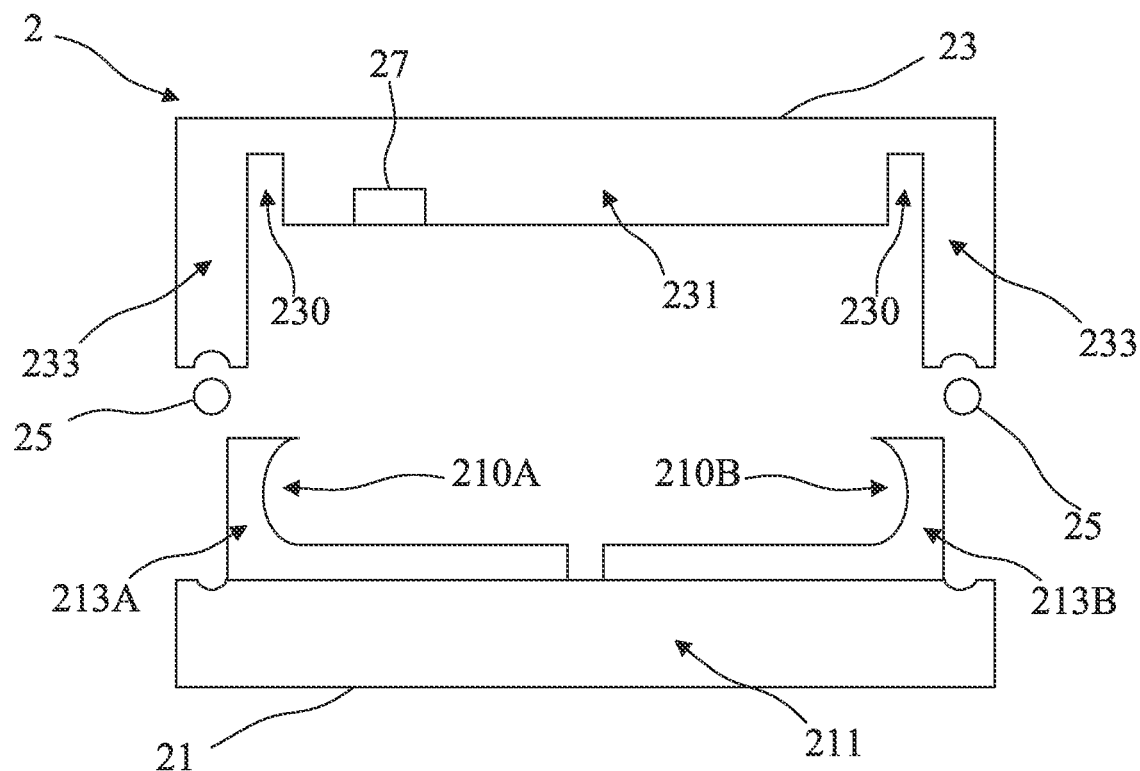
FIGS. 2A to 2F are schematic cross-sectional views illustrating a molding device according to one embodiment of the present invention.

FIG. 2A is a schematic cross-sectional view illustrating a molding device 2. In some embodiments, the molding device 2 includes a first mold 21, a second mold 23, a sealing ring 25 and a pressure sensor 27. The first mold 21 includes a first body 211 and two slides 213A, and 213B. The slides 213A, 213B are movably and detachably disposed on the first body 211. The slide 213A has an undercut 210A, and the slide 213B has an undercut 210B (i.e., the undercuts 210A, 210B are respectively formed on the slides 213A, 213B).

The second mold 23 includes a second body 231 and a periphery portion 233. The periphery portion 233 is disposed with the second body 231. A pressure buffer space 230 is defined by the second body 231 and the periphery portion 233. The sealing ring 25 is disposed between the first body 211 of the first mold 21 and the periphery portion 233 of the second mold 23. The sealing ring 25 is disposed around the molding device 2 for blocking leakage of gas from inside of the molding device 2. In some embodiments, the sealing ring 25 includes flexible material for enhancing function of blocking leakage of gas from inside of the molding device 2.

Figure 2B:
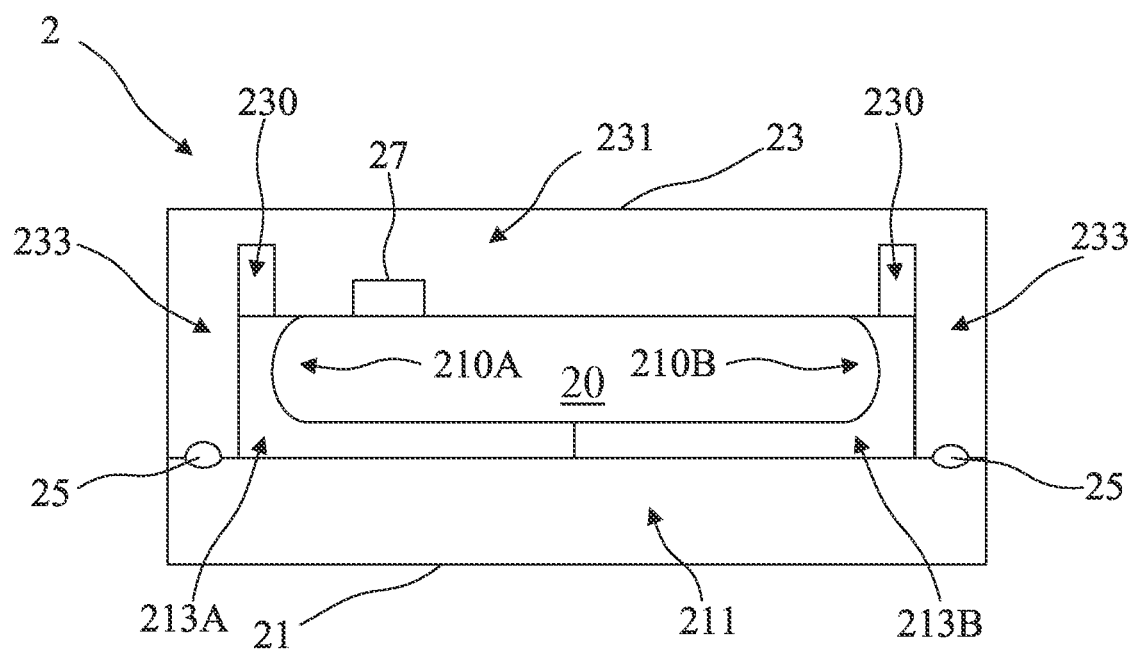

FIG. 2B is another schematic cross-sectional view illustrating the molding device 2. In some embodiments, when the first mold 21 and the second mold 23 are engaged, a mold cavity 20 is defined by the slides 213A, 231B of the first mold 21 and the second body 231 of the second mold 23, and the sealing ring 25 is clamped by the first body 211 of the first mold 21 and the periphery portion 233 of the second mold 23. The pressure sensor 27 is disposed on the second mold 23 for sensing gas pressure inside the mold cavity 20. In some embodiments, the pressure sensor 27 can be disposed on the first mold 21 or the second mold 23.

Figure 2C:
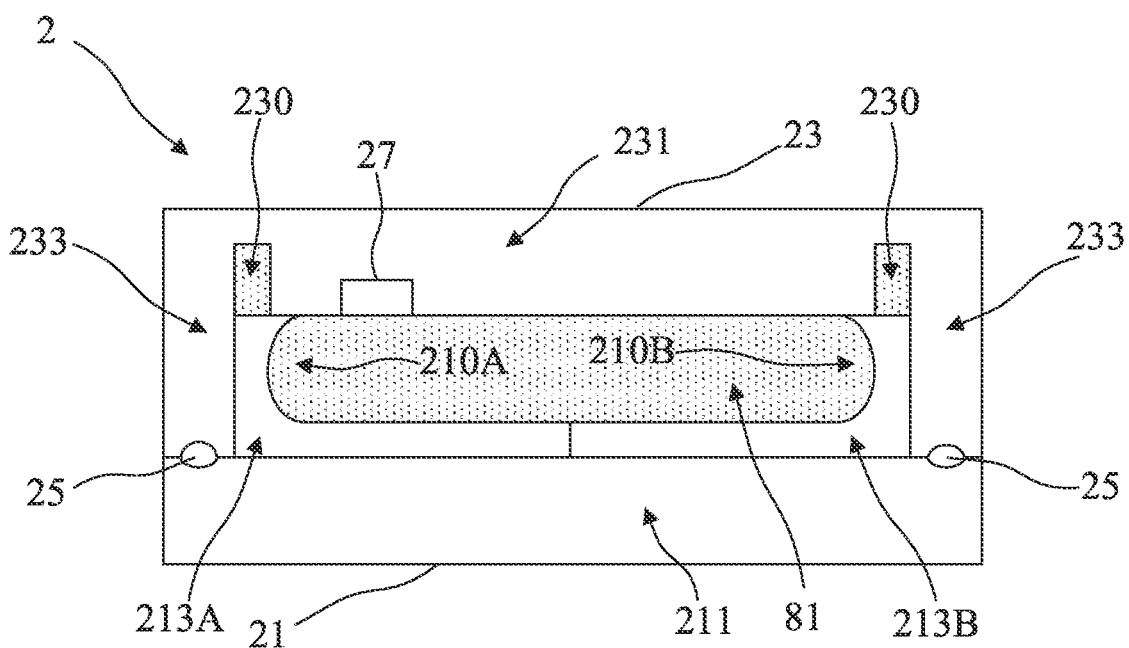

FIG. 2C is another schematic cross-sectional view illustrating the molding device 2. In some embodiments, after engaging the first mold 21 with the second mold 23, a gas 81 is filled into the mold cavity 20 from at least one conduit (not shown), which is disposed on the first mold 21, the second mold 23 or both the first mold 21 and the second mold 23. During the process of filling the gas 81 into the mold cavity 20, the gas pressure inside the mold cavity 20 is sensed by the pressure sensor 27 continuously. The gas 81 is filled into the mold cavity 20 until the pressure sensor 27 senses a predetermined gas pressure inside the mold cavity 20.

In some embodiments, the predetermined gas pressure is greater than a gas pressure outside the mold device 2. The assembly of the first body 211 of the first mold 21 and the periphery portion 233 of the second mold 23 maintains the predetermined gas pressure inside the mold cavity 20. The pressure buffer space 230 buffers variation of the predetermined gas pressure inside the mold cavity 20. The sealing ring 25 disposed between the first body 211 of the first mold 21 and the periphery portion 233 of the second mold 23 is configured to block leakage of the gas 81.

Figure 2D:
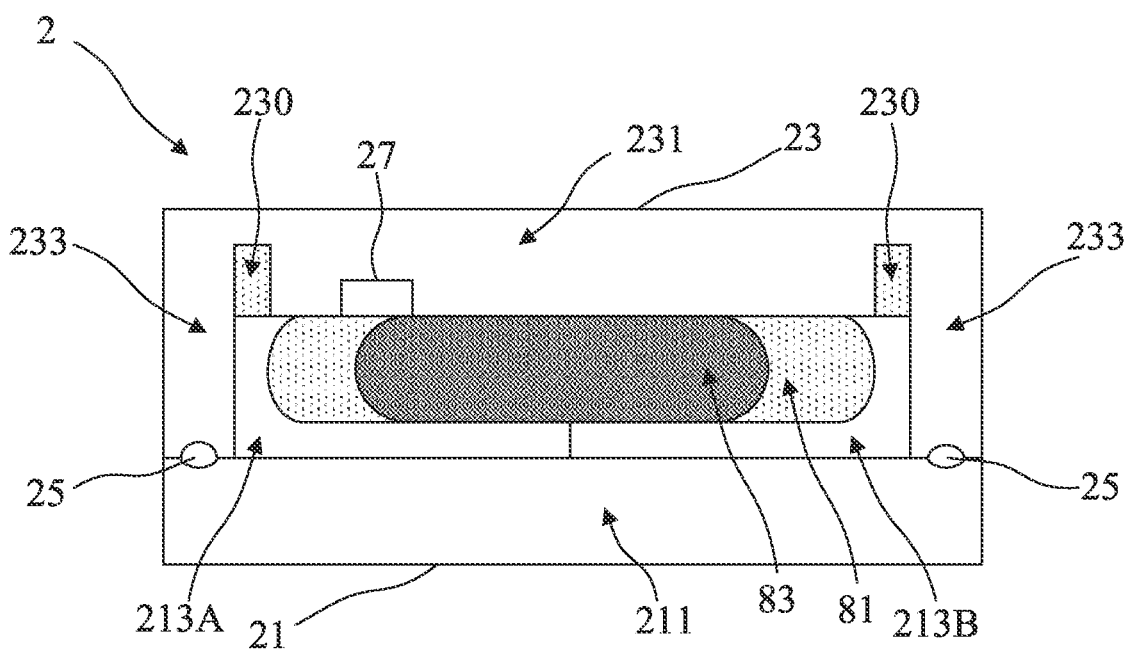
Figure 2E:
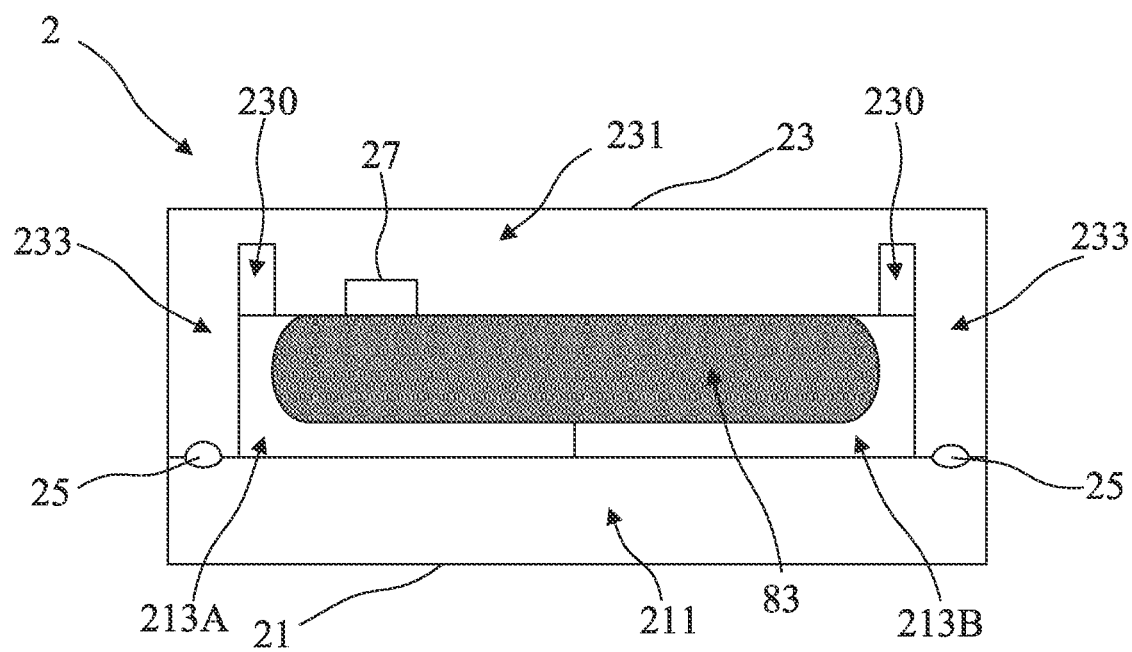

FIGS. 2D and 2E are schematic cross-sectional views illustrating the molding device 2. In some embodiments, after filling the gas 81 into the mold cavity 20, a molding material 83 is injected into the mold cavity 20 from at least one feeding port (not shown), which is disposed on the first mold 21, the second mold 23 or both the first mold 21 and the second mold 23. In some embodiments, the molding material 83 includes a mixture formed by a melted polymeric material mixed with a blowing agent. In some embodiments, the blowing agent includes a supercritical fluid (SCF).

In some embodiments, when the molding material 83 is injected into the mold cavity 20 having the predetermined gas pressure, the molding material 83 is in contact with the gas 81, and the predetermined gas pressure is applied to the molding material 83. During the process of injecting the molding material 83 into the mold cavity 20, the gas pressure inside the mold cavity 20 is raised from the predetermined gas pressure to another gas pressure.

In some embodiments, the gas 81 is discharged from the mold cavity 20 through the at least one conduit when the molding material 83 expands in the mold cavity 20. A density of the molding material 83 expanded in the mold cavity 20 depends on the rate of discharging the gas 81. The rate of discharging the gas 81 is higher, the density of the molding material 83 expanding in the mold cavity 20 is lower so that a density of an article formed by the molding material 83 is lower.

In some embodiments, the completion of: (1) the injecting the molding material 83; and (2) the discharge of the gas 81 lasts less than 1 second. In some embodiments, due to: (1) the mold cavity 20 has the predetermined gas pressure before the molding material 83 is injected; and (2) the predetermined gas pressure is greater than the gas pressure outside the mold device 2, the completion of: (1) the injecting the molding material 83; and (2) the discharge of the gas 81 lasts less than 0.5 second.

Figure 2F:
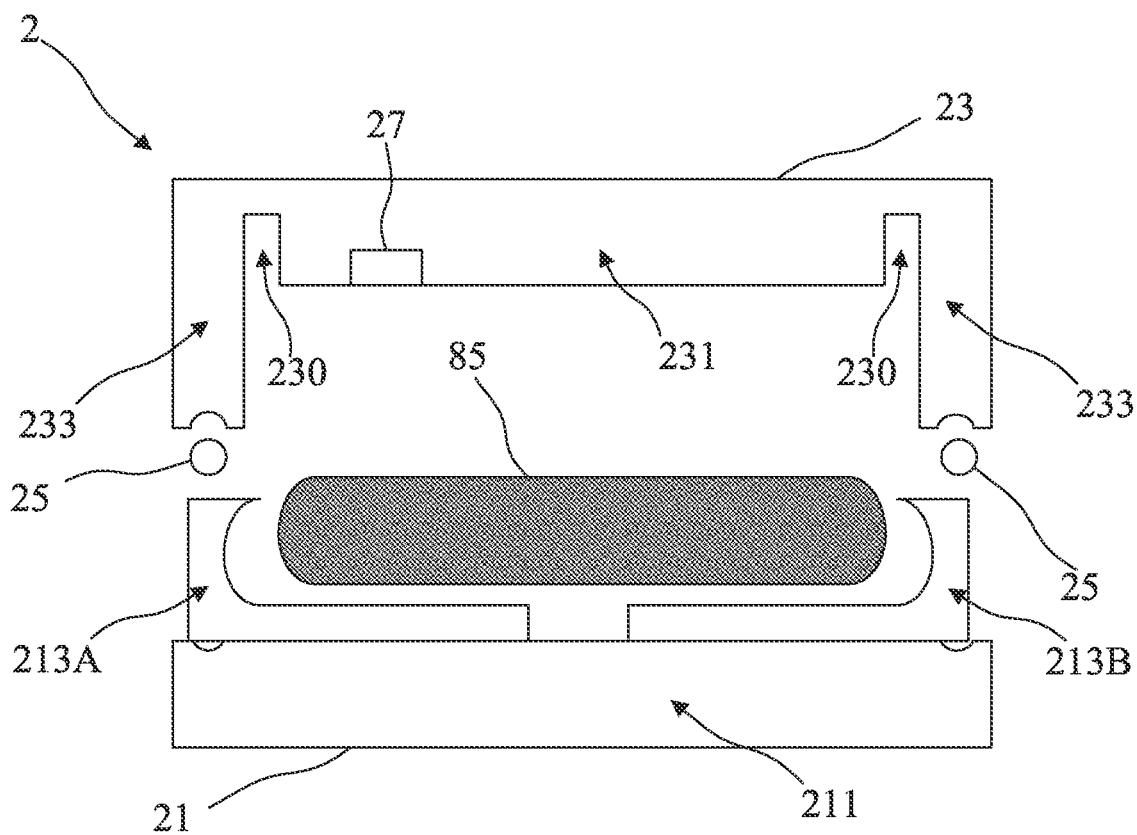

FIG. 2F is another schematic cross-sectional view illustrating the molding device 2. In some embodiments, after the injected molding material 83 cooled down, the first mold 21 and the second mold 23 are opened. The slides 213A, 213B are detached for demolding an article 85 from the mold device 2. More specifically, before demolding the article 85 from the mold device 2, the article 85 is held or secured by the undercut 210A of the slide 213A and the undercut 210B of the slide 213B. Therefore, the article 85 cannot be picked up easily unless the slides 213A and 213B are laterally moved. In other words, after the movements of the slides 213A and 213B, the article 85 can then be picked up easily.

Figure 3A:
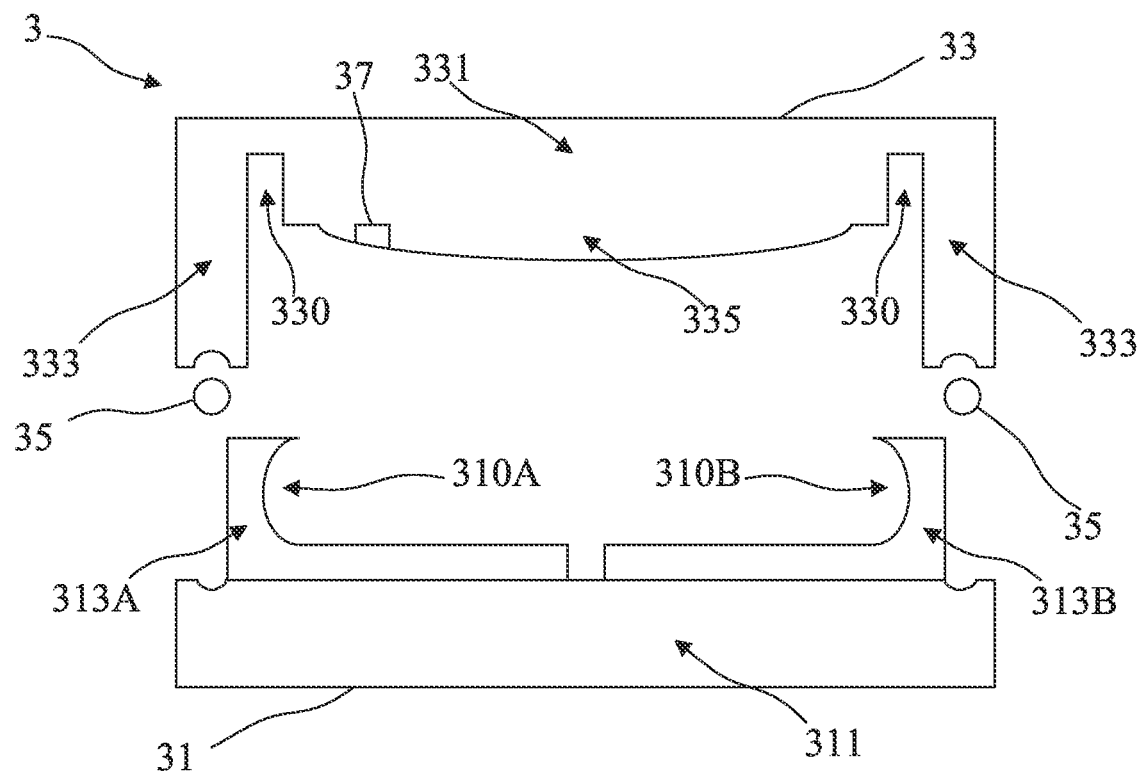
FIGS. 3A to 3F are schematic cross-sectional views illustrating a molding device according to one embodiment of the present invention.

FIG. 3A is a schematic cross-sectional view illustrating a molding device 3. In some embodiments, the molding device 3 includes a first mold 31, a second mold 33, a sealing ring 35 and a pressure sensor 37. The first mold 31 includes a first body 311 and two slides 313A, 313B. The slides 313A, 313B are movably and detachably disposed on the first body 311. The slide 313A has an undercut 310A, and the slide 313B has an undercut 310B (i.e., the undercuts 310A, 310B are respectively formed on the slides 313A, 313B).

The second mold 33 includes a second body 331, a periphery portion 333 and an inner core 335. The periphery portion 333 is coupled with the second body 331. A pressure buffer space 330 is defined by the second body 331 and the periphery portion. The inner core 335 is disposed on the second body 331 and opposite to the first mold 31. The sealing ring 35 is disposed between the first body 311 of the first mold 31 and the periphery portion 333 of the second mold 33. The sealing ring 35 is disposed around the molding device 3 for blocking leakage of gas from inside of the molding device 3. In some embodiments, the sealing ring 35 includes flexible material for enhancing function of blocking leakage of gas from inside of the molding device 3.

Figure 3B:
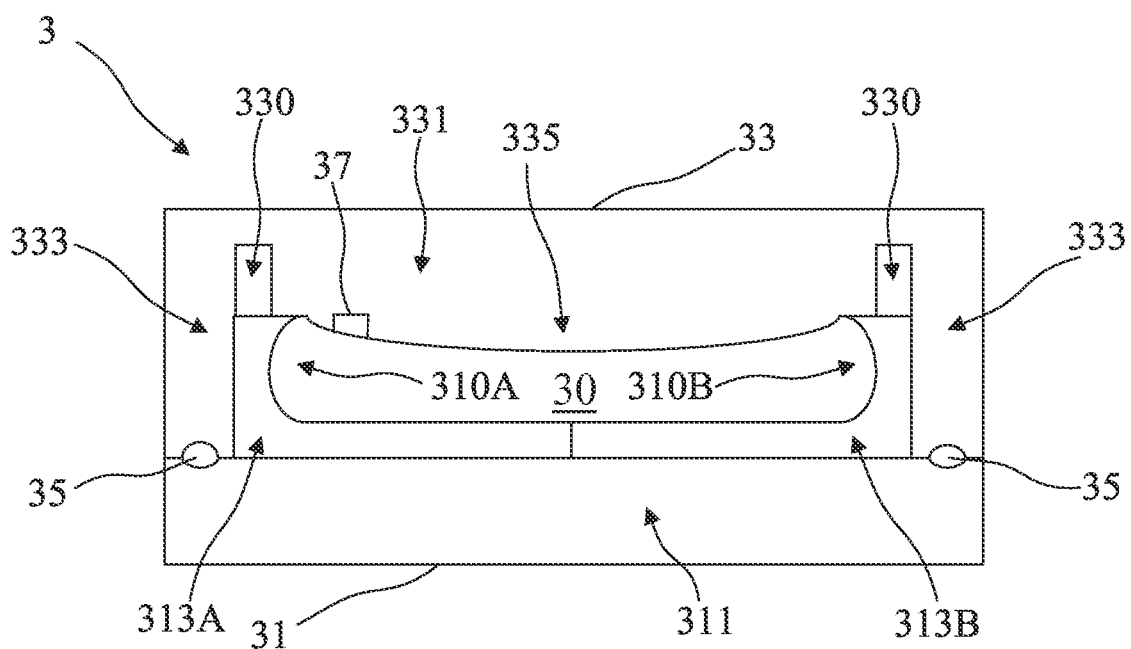

FIG. 3B is another schematic cross-sectional view illustrating the molding device 3. In some embodiments, when the first mold 31 and the second mold 33 are engaged, a mold cavity 30 is defined by the slides 313A, 313B of the first mold 31 and the inner core 335 of the second mold 33, and the sealing ring 35 is clamped by the first body 311 of the first mold 31 and the periphery portion 333 of the second mold 33. The pressure sensor 37 is disposed on the second mold 33 for sensing gas pressure inside the mold cavity 30. In some embodiments, the pressure sensor 37 can be disposed on the first mold 31 or the second mold 33.

Figure 3C:
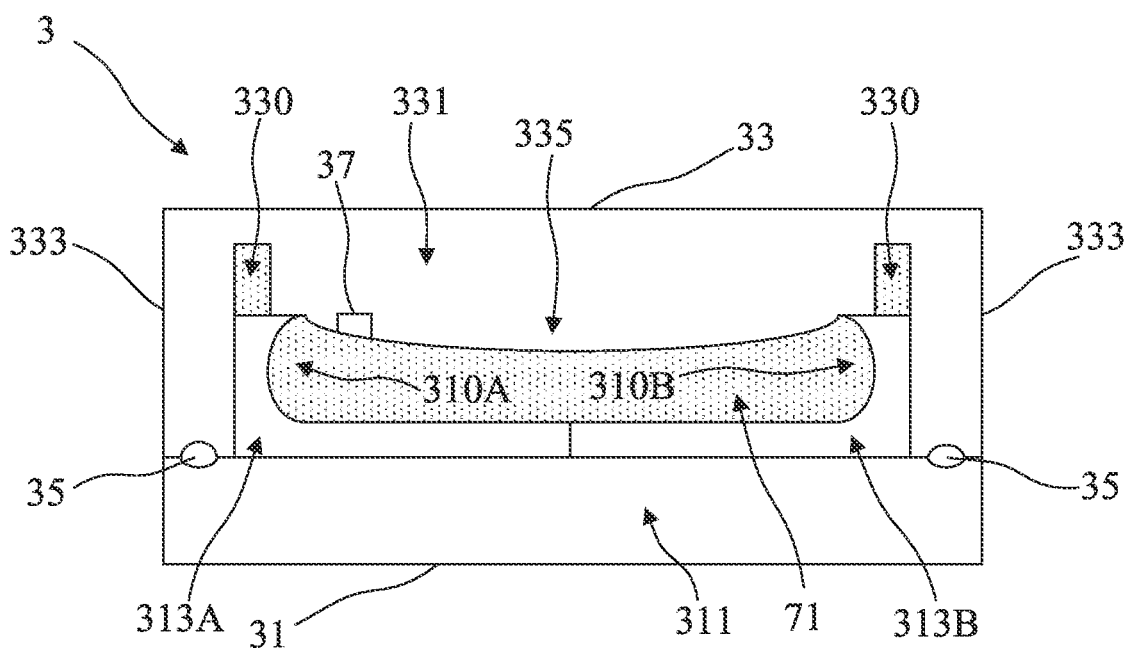

FIG. 3C is another schematic cross-sectional view illustrating the molding device 3. In some embodiments, after engaging the first mold 31 with the second mold 33, a gas 71 is filled into the mold cavity 30 from at least one conduit (not shown), which is disposed on the first mold 31, the second mold 33 or both the first mold 31 and the second mold 33. During the process of filling the gas 71 into the mold cavity 30, the gas pressure inside the mold cavity 30 is sensed by the pressure sensor 37 continuously. The gas 71 is filled into the mold cavity 30 until the pressure sensor 37 senses a predetermined gas pressure inside the mold cavity 30.

In some embodiments, the predetermined gas pressure is greater than a gas pressure outside the mold device 3. The assembly of the first body 311 of the first mold 31 and the periphery portion 333 of the second mold 33 maintains the predetermined gas pressure inside the mold cavity 30 and the pressure buffer space 330. The pressure buffer space 330 buffers variation of the predetermined gas pressure inside the mold cavity 30. The sealing ring 35 disposed between the first body 311 of the first mold 31 and the periphery portion 333 of the second mold 33 is configured to block leakage of the gas 71.

Figure 3D:
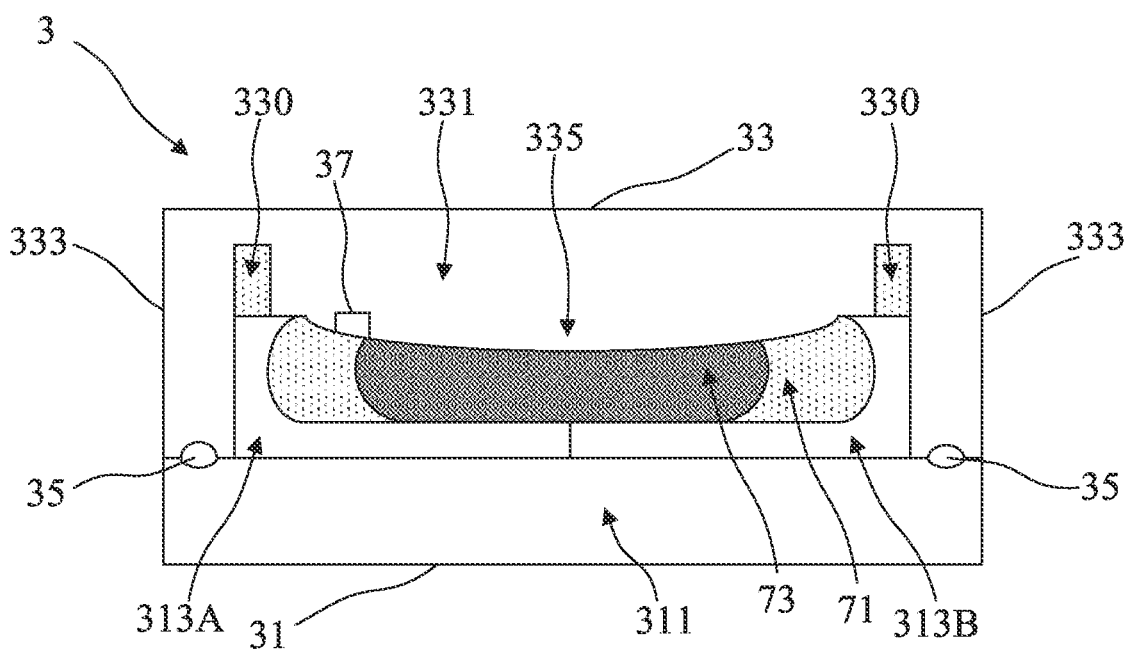
Figure 3E:
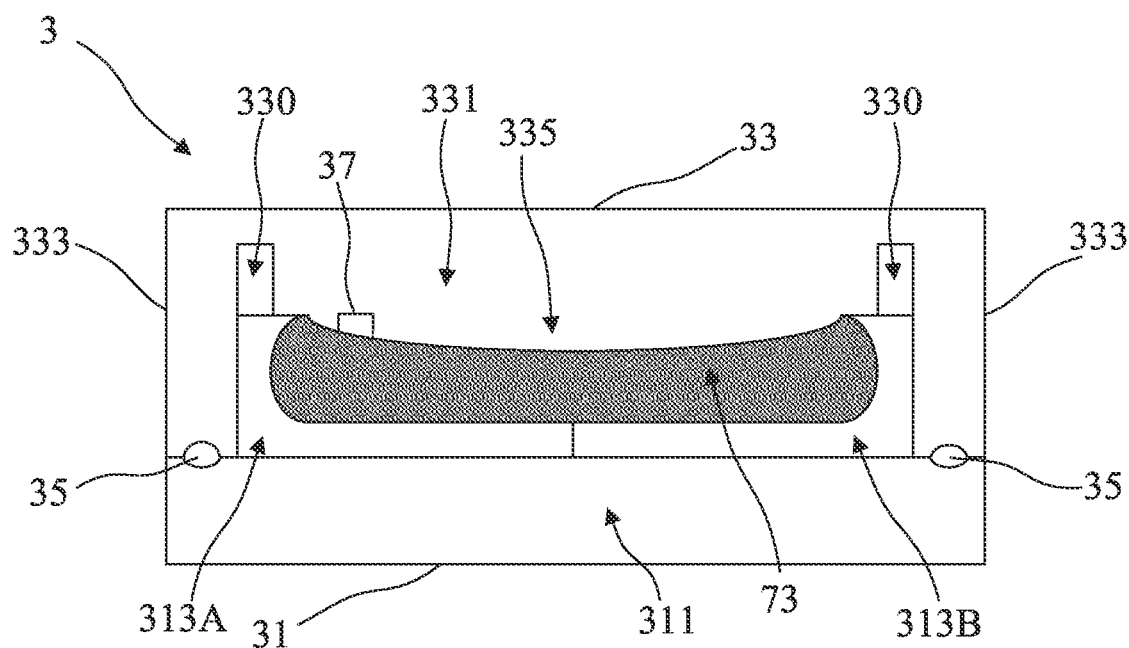

FIGS. 3D and 3E are schematic cross-sectional views illustrating the molding device 3. In some embodiments, after filling the gas 71 into the mold cavity 30, a molding material 73 is injected into the mold cavity 30 from at least one feeding port (not shown), which is disposed on the first mold 31, the second mold 33 or both the first mold 31 and the second mold 33. In some embodiments, the molding material 73 includes a mixture formed by a melted polymeric material mixed with a blowing agent. In some embodiments, the blowing agent includes a SCF.

In some embodiments, when the molding material 73 is injected into the mold cavity 30 having the predetermined gas pressure, the molding material 73 is in contact with the gas 71, and the predetermined gas pressure is applied to the molding material 73. During the process of injecting the molding material 73 into the mold cavity 30, the gas pressure inside the mold cavity 30 is raised from the predetermined gas pressure to another gas pressure.

In some embodiments, the gas 71 is discharged from the mold cavity 30 and the pressure buffer space 330 through the at least one conduit when the molding material 73 expands in the mold cavity 30. A density of the molding material 73 expanded in the mold cavity 30 depends on the rate of discharging the gas 71. The rate of discharging the gas 71 is higher, the density of the molding material 73 expanding in the mold cavity 30 is lower so that a density of an article formed by the molding material 73 is lower.

In some embodiments, the completion of: (1) the injecting the molding material 73; and (2) the discharge of the gas 71 lasts less than 1 second. In some embodiments, due to: (1) the mold cavity 30 has the predetermined gas pressure before the molding material 73 is injected; and (2) the predetermined gas pressure is greater than the gas pressure outside the mold device 3, the completion of: (1) the injecting the molding material 73; and (2) the discharge of the gas 71 lasts less than 0.5 second.

Figure 3F:
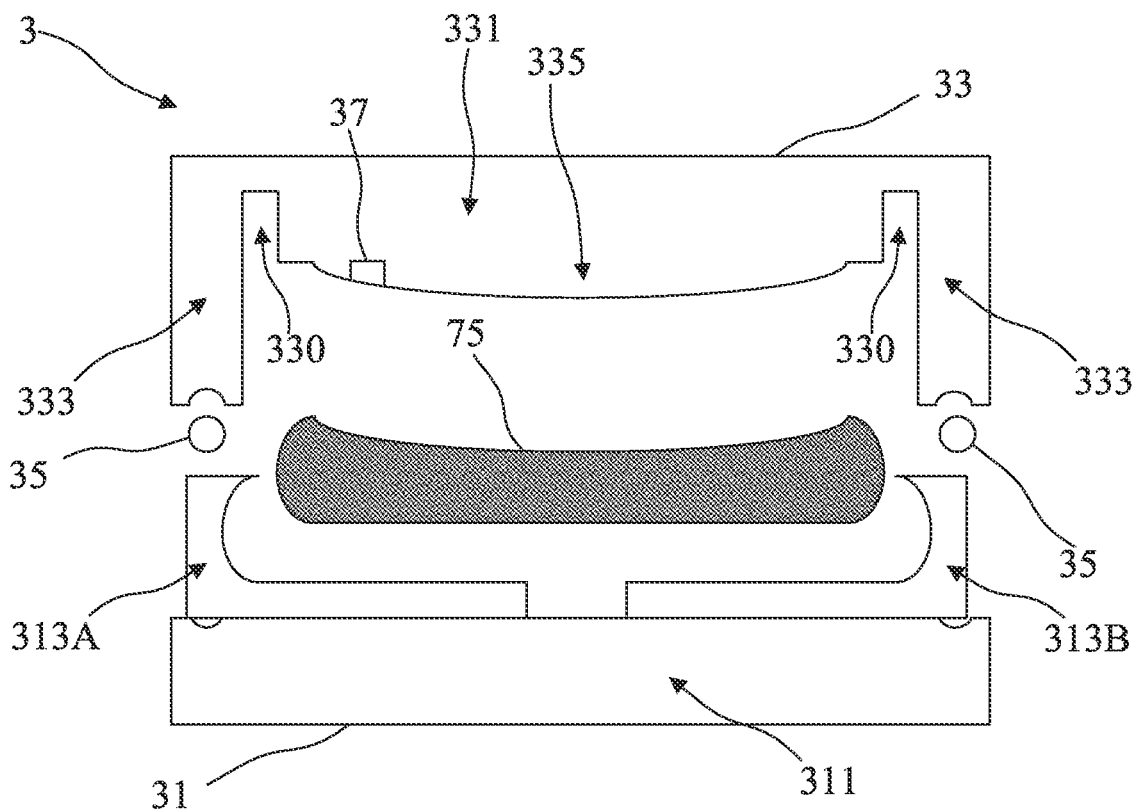

FIG. 3F is another schematic cross-sectional view illustrating the molding device 3. In some embodiments, after the injected molding material 73 cooled down, the first mold 31 and the second mold 33 are opened. The slides 313A, 313B are detached for demolding an article 75 from the mold device 3. More specifically, before demolding the article 75 from the mold device 3, the article 75 is held or secured by the undercut 310A of the slide 313A and the undercut 310B of the slide 313B. Therefore, the article 75 cannot be picked up easily unless the slides 313A and 313B are laterally moved. In other words, after the movements of the slides 313A and 313B, the article 75 can then be picked up easily.

Figure 4A:
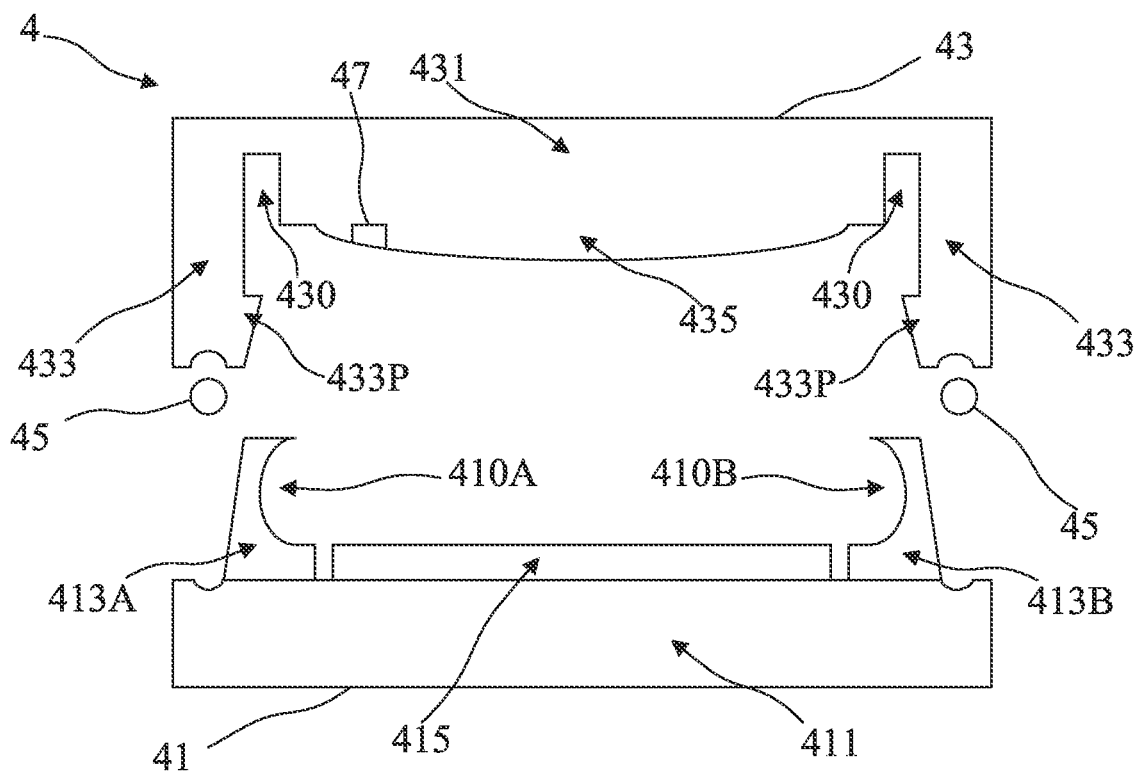
FIGS. 4A to 4F are schematic cross-sectional views illustrating a molding device according to one embodiment of the present invention.

FIG. 4A is a schematic cross-sectional view illustrating a molding device 4. In some embodiments, the molding device 4 includes a first mold 41, a second mold 43, a sealing ring 45 and a sensor 47. The first mold 41 includes a first body 411, two slides 413A, 413B and a first inner core 415. The slides 413A, 413B are movably and detachably disposed on the first body 411. The first inner core 415 is disposed on the first body 411 and opposite to the second mold 43. The slide 413A has an undercut 410A, and the slide 413B has an undercut 410B (i.e., the undercuts 410A, 410B are respectively formed on the slides 413A, 413B).

The second mold 43 includes a second body 431, a periphery portion 433 and a second inner core 435. The periphery portion 433 is coupled with the second body 431, and includes a protrusion 433P. A pressure buffer space 430 is defined by the second body 431 and the periphery portion 433. The second inner core 435 is disposed on the second body 431 and opposite to the first inner core 415. The sealing ring 45 is disposed between the first body 411 of the first mold 41 and the periphery portion 433 of the second mold 43. The sealing ring 45 is disposed around the molding device 4 for blocking leakage of gas from inside of the molding device 4. In some embodiments, the sealing ring 45 includes flexible material for enhancing function of blocking leakage of gas from inside of the molding device 4.

Figure 4B:
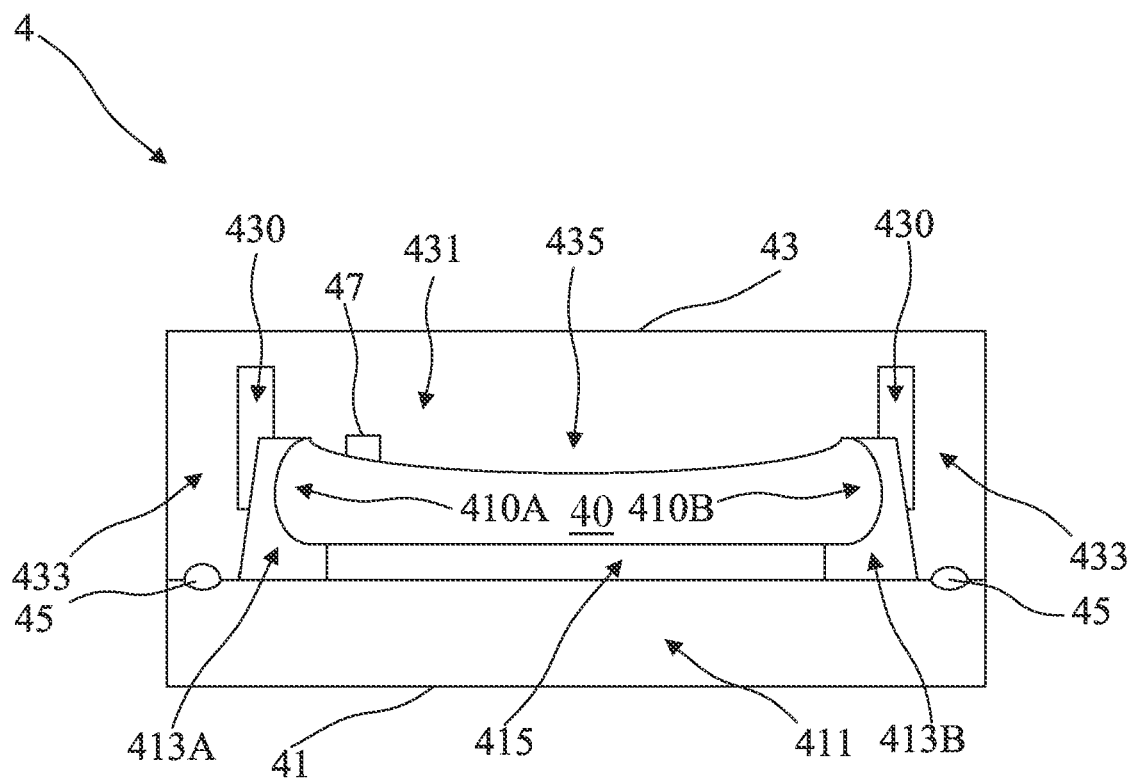

FIG. 4B is another schematic cross-sectional view illustrating the molding device 4. In some embodiments, when the first mold 41 and the second mold 43 are engaged, a mold cavity 40 is defined by the slides 413A, 413B, the first inner core 415 and the second inner core 435 of the second mold 43, and the sealing ring 45 is clamped by the first body 411 of the first mold 41 and the periphery portion 433 of the second mold 43. The protrusion 433P fits the shapes of the slides 413A, 413B. The pressure sensor 47 is disposed on the second mold 43 for sensing gas pressure inside the mold cavity 40. In some embodiments, the pressure sensor 47 can be disposed on the first mold 41 or the second mold 43.

Figure 4C:
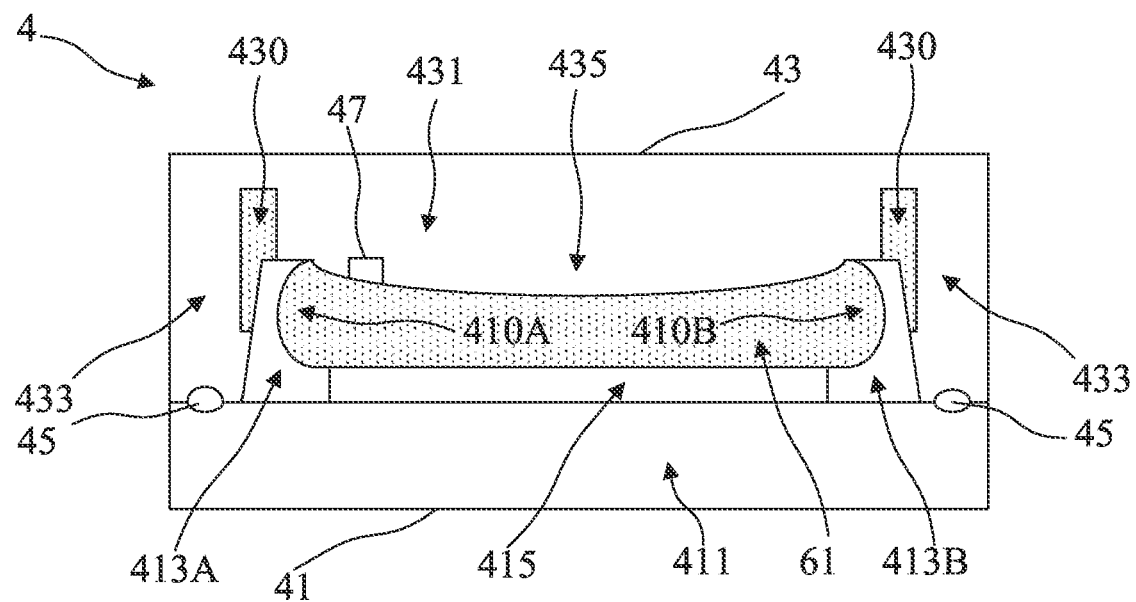

FIG. 4C is another schematic cross-sectional view illustrating the molding device 4. In some embodiments, after engaging the first mold 41 with the second mold 43, a gas 61 is filled into the mold cavity 40 from at least one conduit (not shown), which is disposed on the first mold 41, the second mold 43 or both the first mold 41 and the second mold 43. During the process of filling the gas 61 into the mold cavity 40, the gas pressure inside the mold cavity 40 is sensed by the pressure sensor 47 continuously. The gas 641 is filled into the mold cavity 40 until the pressure sensor 47 senses a predetermined gas pressure inside the mold cavity 40.

In some embodiments, the predetermined gas pressure is greater than a gas pressure outside the mold device 4. The assembly of the first body 411 of the first mold 41 and the periphery portion 433 of the second mold 43 maintains the predetermined gas pressure inside the mold cavity 40 and the pressure buffer space 430. The pressure buffer space 430 buffers variation of the predetermined gas pressure inside the mold cavity 40. The sealing ring 45 disposed between the first body 411 of the first mold 41 and the periphery portion 433 of the second mold 43 is configured to block leakage of the gas 61.

Figure 4D:
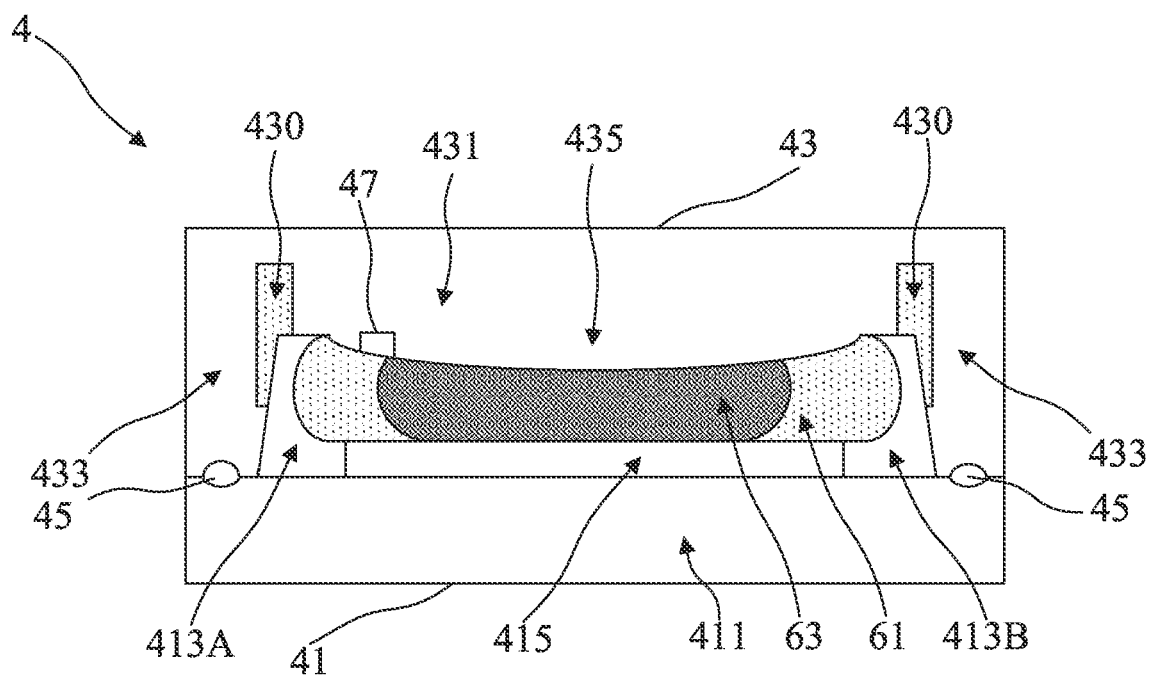
Figure 4E:
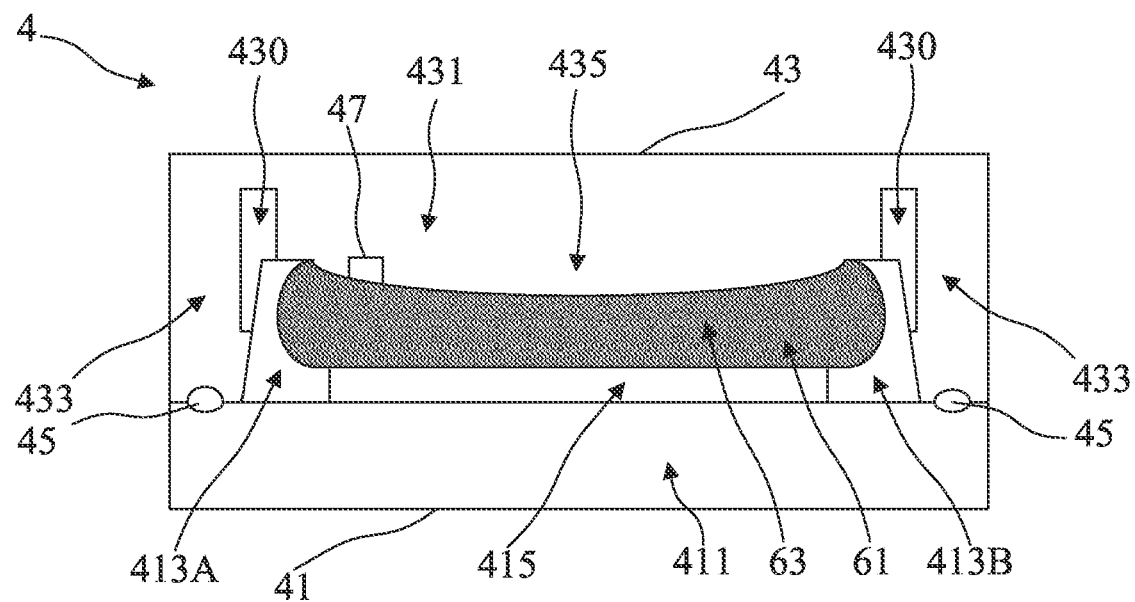

FIGS. 4D and 4E are schematic cross-sectional views illustrating the molding device 4. In some embodiments, after filling the gas 61 into the mold cavity 40, a molding material 63 is injected into the mold cavity 40 from at least one feeding port (not shown), which is disposed on the first mold 41, the second mold 43 or both the first mold 41 and the second mold 43. In some embodiments, the molding material 63 includes a mixture formed by a melted polymeric material mixed with a blowing agent. In some embodiments, the blowing agent includes a SCF.

In some embodiments, when the molding material 63 is injected into the mold cavity 40 having the predetermined gas pressure, the molding material 63 is in contact with the gas 61, and the predetermined gas pressure is applied to the molding material 63. During the process of injecting the molding material 63 into the mold cavity 40, the gas pressure inside the mold cavity 40 is raised from the predetermined gas pressure to another gas pressure.

In some embodiments, the gas 61 is discharged from the mold cavity 40 and the pressure buffer space 430 through the at least one conduit when the molding material 63 expands in the mold cavity 40. A density of the molding material 63 expanded in the mold cavity 40 depends on the rate of discharging the gas 61. The rate of discharging the gas 61 is higher, the density of the molding material 63 expanding in the mold cavity 40 is lower so that a density of an article formed by the molding material 63 is lower.

In some embodiments, the completion of: (1) the injecting the molding material 63; and (2) the discharge of the gas 61 lasts less than 1 second. In some embodiments, due to: (1) the mold cavity 40 has the predetermined gas pressure before the molding material 63 is injected; and (2) the predetermined gas pressure is greater than the gas pressure outside the mold device 4, the completion of: (1) the injecting the molding material 63; and (2) the discharge of the gas 61 lasts less than 0.5 second.

Figure 4F:
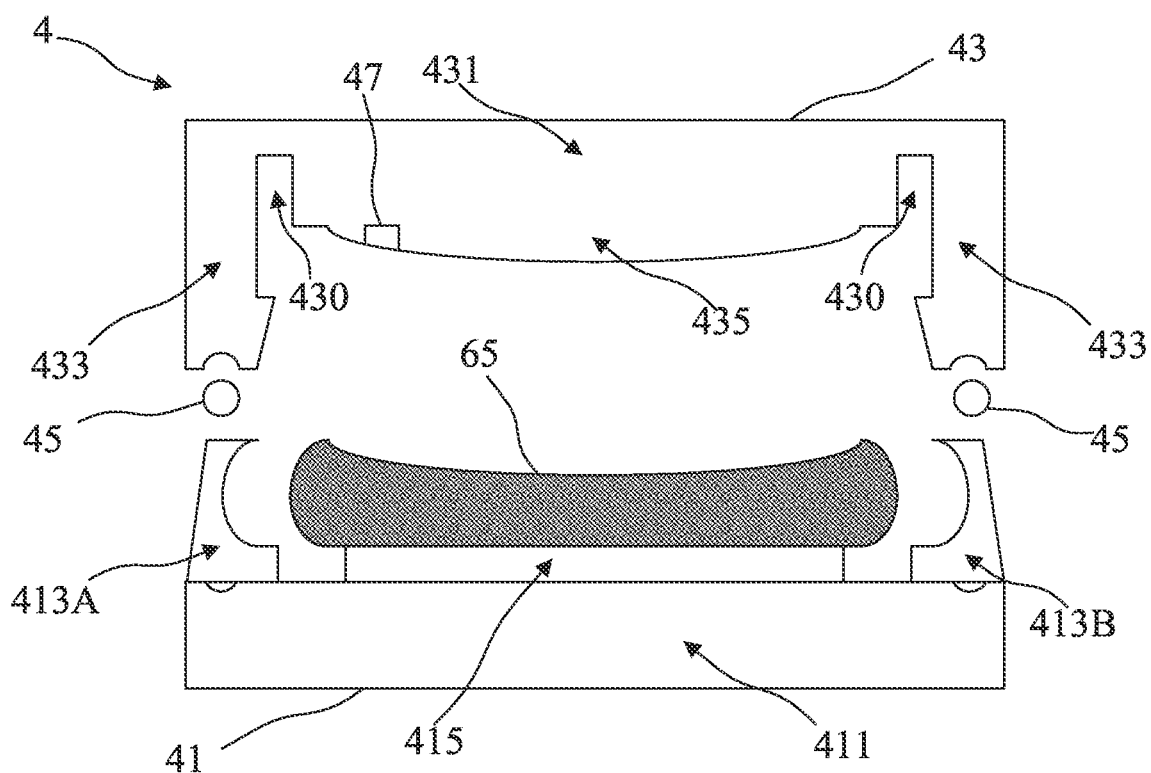

FIG. 4F is another schematic cross-sectional view illustrating the molding device 4. In some embodiments, after the injected molding material 63 cooled down, the first mold 41 and the second mold 43 are opened. The slides 413A, 413B are detached for demolding an article 65 from the mold device 4. More specifically, before demolding the article 65 from the mold device 4, the article 65 is held or secured by the undercut 410A of the slide 413A and the undercut 410B of the slide 413B. Therefore, the article 65 cannot be picked up easily unless the slides 413A and 413B are laterally moved. After the movements of the slides 413A and 413B, the article 65 is supported by the first inner core 415, and then the article 65 can be picked up easily from the first inner core 415.

Figure 5:
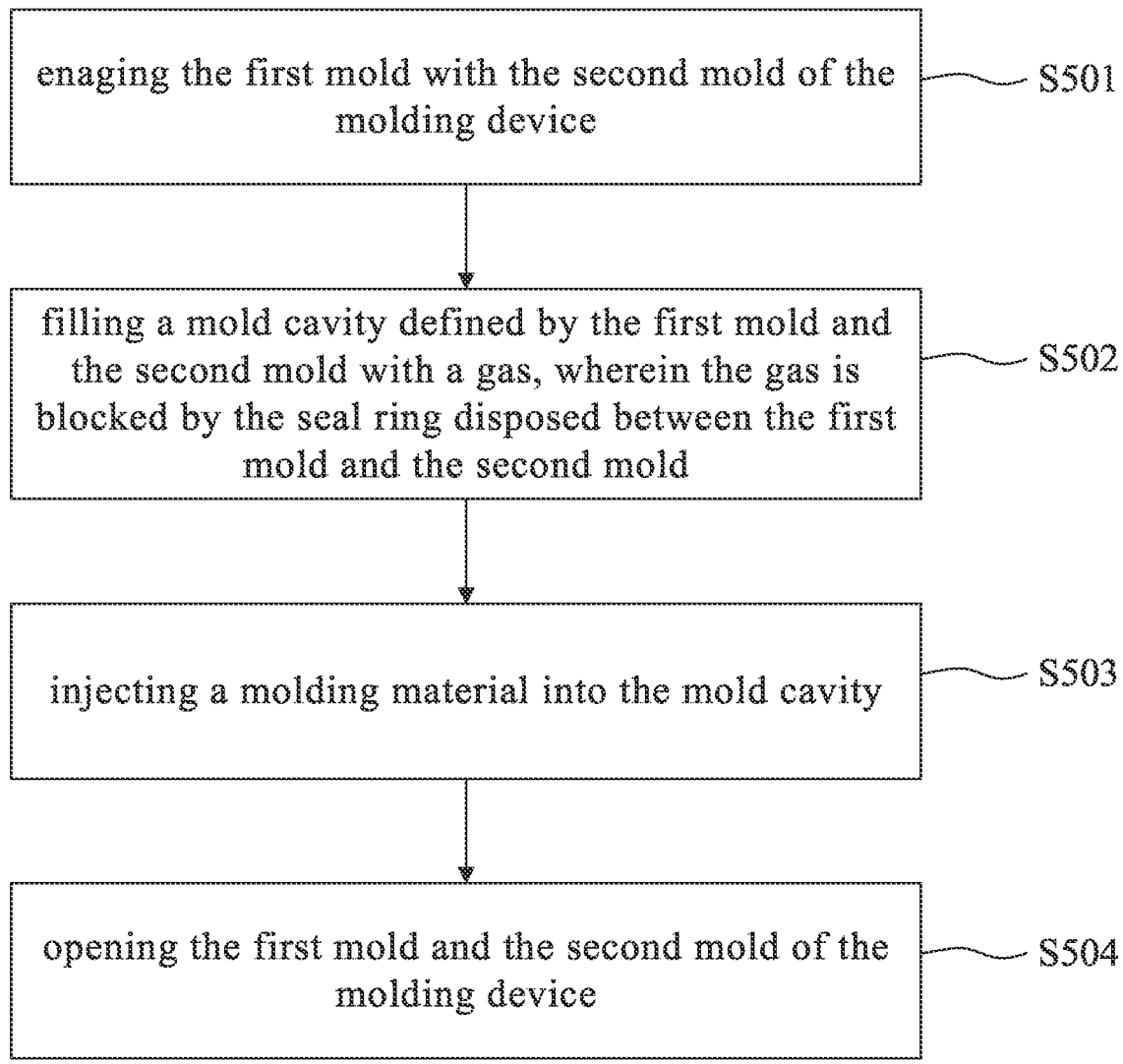
FIG. 5 is a flowchart illustrating an injection molding method according to one embodiment of the present invention.

FIG. 5 is a flowchart showing an injection molding method in accordance with some embodiments of the present disclosure. The injection molding method is implemented by a molding device. The molding device includes a first mold, a second mold and a sealing ring. The first mold includes a first body and at least one slide movably and detachably disposed on the first body. The at least one slide has an undercut (i.e., the undercut is formed on the at least one slide).

The injection molding method includes several operations: S501 of engaging the first mold with the second mold of the molding device; S502 of filling a gas into a mold cavity defined by the first mold and the second mold, wherein the gas is blocked by the sealing ring disposed between the first mold and the second mold; S503 of injecting a molding material into the mold cavity; and S504 of opening the first mold and the second mold of the molding device.

In some embodiments, the injection molding method is implemented by the molding devices 1 to 4 as shown in FIGS. 1A to 4F, and FIGS. 1A to 4F are schematic cross-sectional views of various stages of the injection molding method.

Figure 6:
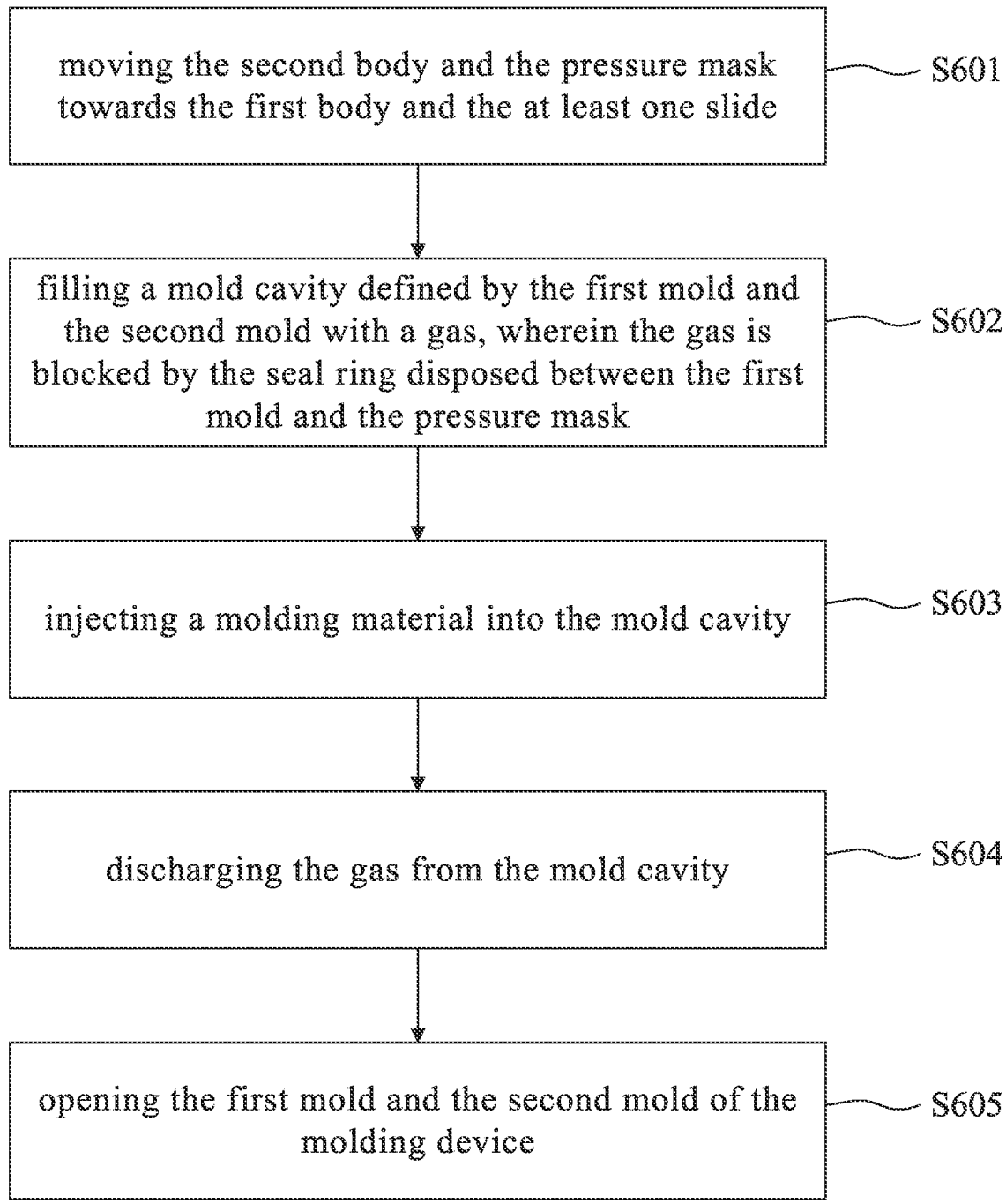
FIG. 6 is a flowchart illustrating an injection molding method according to one embodiment of the present invention.

FIG. 6 is a flowchart showing an injection molding method in accordance with some embodiments of the present disclosure. The injection molding method is implemented by a molding device. The molding device includes a first mold, a second mold and a sealing ring. The first mold includes a first body and at least one slide movably and detachably disposed on the first body. The at least one slide has an undercut (i.e., the undercut is formed on the at least one slide). The second mold includes a second body and a periphery portion coupled with the second body.

The injection molding method includes several operations: S601 of moving the second body and the periphery portion towards the first body and the at least one slide; S602 of filling a gas into a mold cavity defined by the first mold and the second mold, wherein the gas is blocked by the sealing ring disposed between the first mold and the periphery portion; S603 of injecting a molding material into the mold cavity; S604 of discharging the gas from the mold cavity; and S605 of opening the first mold and the second mold of the molding device.

In some embodiments, the mold cavity has a predetermined gas pressure after filling the gas. The predetermined gas pressure is greater than a gas pressure outside the mold device. In some embodiments, the injection molding method is implemented by the molding devices 1 to 4 as shown in FIGS. 1A to 4F, and FIGS. 1A to 4F are schematic cross-sectional views of various stages of the injection molding method.

Figure 7:
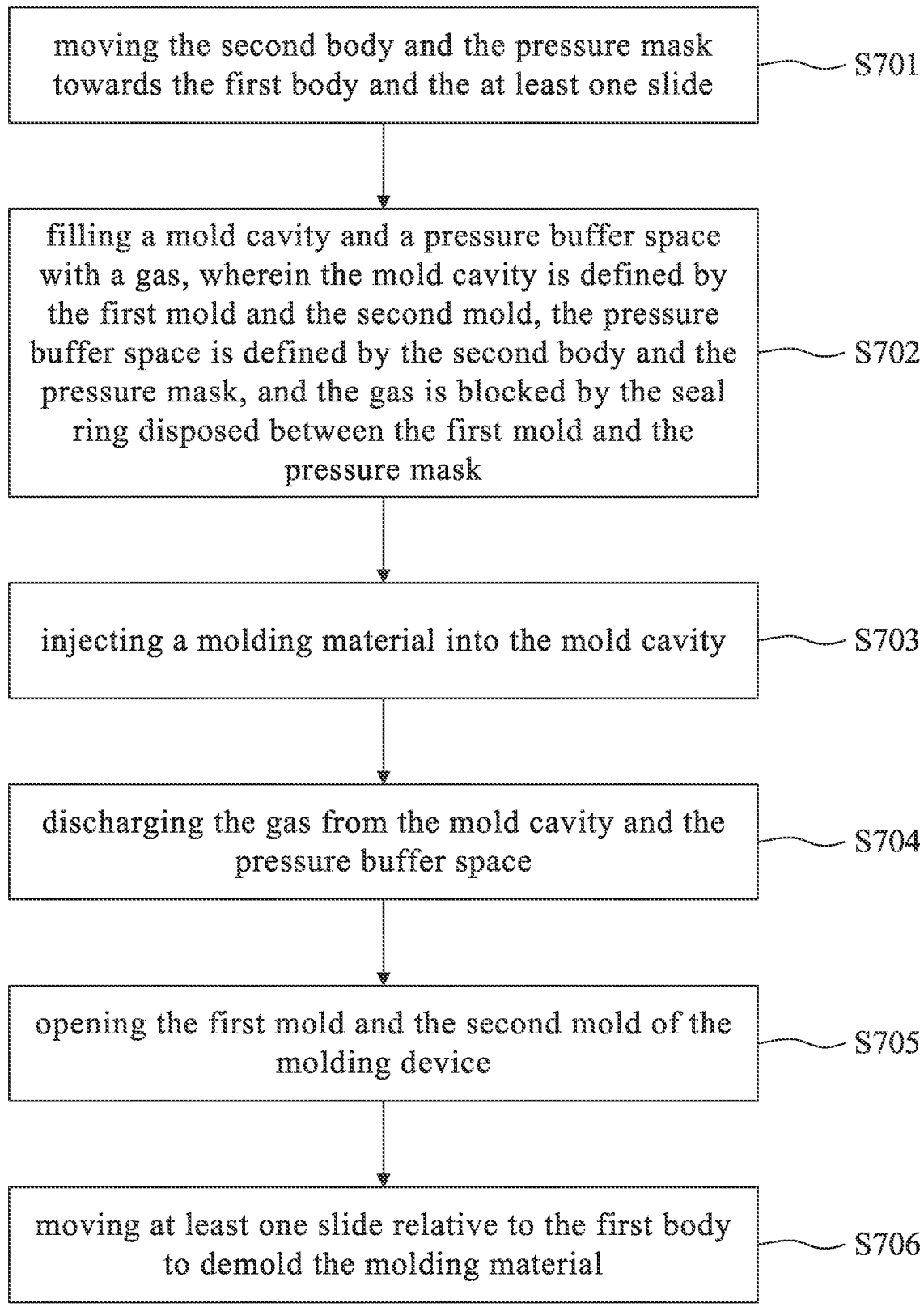
FIG. 7 is a flowchart illustrating an injection molding method according to one embodiment of the present invention.

FIG. 7 is a flowchart showing an injection molding method in accordance with some embodiments of the present disclosure. The injection molding method is implemented by a molding device. The molding device includes a first mold, a second mold and a sealing ring. The first mold includes a first body and at least one slide movably and detachably disposed on the first body. The at least one slide has an undercut (i.e., the undercut is formed on the at least one slide). The second mold includes a second body and a periphery portion coupled with the second body.

The injection molding method includes several operations: S701 of moving the second body and the periphery portion towards the first body and the at least one slide; S702 of filling a gas into a mold cavity defined by the first mold and the second mold and into a pressure buffer space defined by the second body and the periphery portion, wherein the gas is blocked by the sealing ring disposed between the first mold and the periphery portion; S703 of injecting a molding material into the mold cavity; S704 of discharging the gas from the mold cavity and the pressure buffer space; S705 of opening the first mold and the second mold of the molding device; and S706 of moving the at least one slide relative to the first body to demold the molding material. In some embodiments, the molding material may be secured by the undercut prior to the step S706, and the molding material is detachable from the molding device after the step S706.

In some embodiments, the mold cavity has a predetermined gas pressure after filling the gas. The predetermined gas pressure is greater than a gas pressure outside the mold device. In some embodiments, the injection molding method is implemented by the molding devices 1 to 4 as shown in FIGS. 1A to 4F, and FIGS. 1A to 4F are schematic cross-sectional views of various stages of the injection molding method.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A molding device, comprising:
   a first mold including:
      a first body; and
      a slide, movably and detachably disposed on the first body and having an undercut;
   a second mold engageable with the first mold;
   a mold cavity, defined by the first mold and the second mold and configured to hold a molding material;
   a pressure buffer space, defined by the slide and the second mold; and
   a sealing ring, disposed between the first mold and the second mold for sealing the mold cavity,
   wherein the slide is immovable and surrounded by the second mold when the first mold is engaged with the second mold.

2. The molding device of claim 1, wherein the second mold includes:
   a second body; and
   a periphery portion, coupled with the second body.

3. The molding device of claim 2, wherein the periphery portion has at least one protrusion in contact with the slide.

4. The molding device of claim 2, wherein the sealing ring is disposed between the first body of the first mold and the periphery portion of the second mold.

5. The molding device of claim 1, wherein the pressure buffer space is smaller than the mold cavity.

6. The molding device of claim 1, wherein the second mold includes an inner core disposed opposite to the first mold.

7. The molding device of claim 6, wherein the mold cavity is defined by the inner core and the slide.

8. The molding device of claim 1, wherein the first mold includes a first inner core and the second mold includes a second inner core disposed opposite to the first inner core.

9. The molding device of claim 8, wherein the mold cavity is defined by the first inner core, the second inner core and the slide.

10. An injection molding method, comprising:
engaging a first mold with a second mold of a molding device, wherein the first mold includes a first body and a slide, wherein the slide is movably and detachably disposed on the first body and has an undercut;
filling a mold cavity defined by the first mold and the second mold with a first gas, wherein the first gas is blocked by a sealing ring disposed between the first mold and the second mold;
filling a pressure buffer space defined by the slide and the second mold with a second gas;
injecting a molding material into the mold cavity; and
opening the first mold and the second mold of the molding device,
wherein the slide is immovable and surrounded by the second mold after the engagement of the first mold with the second mold.

11. The injection molding method of claim 10, further comprising moving the slide relative to the first body to demold the molding material.

12. The injection molding method of claim 11, wherein the molding material is secured by the undercut prior to the step of moving the slide, and the molding material is detachable from the molding device after the step of moving the slide.

13. The injection molding method of claim 10, wherein the mold cavity has a first gas pressure after the step of filling the mold cavity with the first gas.

14. The injection molding method of claim 13, further comprising:
discharging the first gas from the mold cavity.

15. The injection molding method of claim 13, wherein the first gas pressure is greater than an atmospheric pressure outside the molding device.

16. The injection molding method of claim 13, wherein the pressure buffer space has a second gas pressure after the step of filling the pressure buffer space with the second gas.

17. The injection molding method of claim 16, wherein the second gas pressure is substantially equal to the first gas pressure.

18. The injection molding method of claim 16, wherein the second gas pressure is greater than an atmospheric pressure outside the molding device.

19. The injection molding method of claim 10, wherein the second mold includes a second body and a periphery portion coupled with the second body, and the step of engaging the first mold with the second mold of the molding device further comprises:
moving the second body and the periphery portion towards the first body and the slide.

20. The injection molding method of claim 10, further comprising:
discharging the first gas from the mold cavity and the second gas from the pressure buffer space after the step of injecting the molding material.

* * * * *